United States Patent
Noguchi et al.

(10) Patent No.: US 11,707,716 B2
(45) Date of Patent: Jul. 25, 2023

(54) CONNECTION STRUCTURE AND MEMBRANE FILTRATION DEVICE

(71) Applicant: MEIDENSHA CORPORATION, Tokyo (JP)

(72) Inventors: Hiroshi Noguchi, Singapore (SG); Akitoshi Nakagawa, Inazawa (JP); Terutake Niwa, Singapore (SG)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/912,986

(22) PCT Filed: Mar. 5, 2021

(86) PCT No.: PCT/JP2021/008714
§ 371 (c)(1),
(2) Date: Sep. 20, 2022

(87) PCT Pub. No.: WO2021/192923
PCT Pub. Date: Sep. 30, 2021

(65) Prior Publication Data
US 2023/0125105 A1    Apr. 27, 2023

(30) Foreign Application Priority Data
Mar. 23, 2020  (JP) .................................. 2020-051905

(51) Int. Cl.
*B01D 63/08* (2006.01)

(52) U.S. Cl.
CPC ...... *B01D 63/0822* (2022.08); *B01D 2313/12* (2013.01); *B01D 2313/13* (2013.01); *B01D 2317/00* (2013.01)

(58) Field of Classification Search
CPC ............ B01D 2313/06; B01D 2313/12; B01D 2313/13; B01D 2313/125; B01D 2313/21; B01D 2315/06; B01D 2317/00; B01D 2317/04; B01D 2317/06; B01D 35/303; B01D 63/08; B01D 63/082; B01D 63/0822
See application file for complete search history.

(56) References Cited

U.S. PATENT DOCUMENTS

2018/0280885 A1    10/2018   Yanone et al.

FOREIGN PATENT DOCUMENTS

| JP | 2002-346343 A | 12/2002 |
| JP | 6319510 B2 | 5/2018 |
| JP | 2019-051463 A | 4/2019 |

*Primary Examiner* — Pranav N Patel
(74) *Attorney, Agent, or Firm* — Foley & Lardner LLP

(57) ABSTRACT

A membrane element having a filtration main body, a header (a water collection portion) that collects treated water from an end portion of the filtration main body and a treated water lead-out portion that leads out the treated water is used. The treated water lead-out portion is connected to a tubular peripheral wall of a water collection pipe that collects treated water solid-liquid-separated by the membrane element, and communicates with an inside of the tubular peripheral wall. The tubular peripheral wall has a thick portion that is thicker in a horizontal direction at an upper-side peripheral wall portion located at an upper side (or at a lower-side peripheral wall portion located at a lower side) in the radial direction of the tubular peripheral wall, and a connecting hole that penetrates the thick portion.

10 Claims, 6 Drawing Sheets

CONNECTION STRUCTURE AND MEMBRANE FILTRATION DEVICE

TECHNICAL FIELD

The present invention relates to a connecting structure between a membrane element and a water collection pipe and a membrane filtration device that can be applied to various facilities such as sewage treatment and industrial wastewater treatment.

BACKGROUND ART

As an example of a liquid-solid separation system that can be applied to various facilities such as sewage treatment and industrial wastewater treatment, a membrane filtration device using a membrane separation technology is known. This membrane filtration device is immersed in a liquid phase, for instance, in a biological treatment tank or a coagulation treatment tank (or a flocculation treatment tank), then treated water treated in the tank can be solid-liquid-separated into solid substances and water components.

For solid-liquid separation of the treated water, for instance, a membrane element having a filtration main body used for membrane separation, a water collection portion that collects treated water (filtered treated water) having undergone the membrane separation from an end portion of the filtration main body and a treated water lead-out portion that leads out the treated water coming from the water collection portion is used. By connecting a water collection pipe to this treated water lead-out portion of the membrane element, the treated water solid-liquid-separated by the membrane element can be collected in the water collection pipe, then taken out to the outside (e.g. a place where a treatment process in a subsequent stage of the membrane filtration device is performed).

Patent Document 1 discloses a connecting structure in which both of the membrane element and the water collection pipe are connected through a tubular junction pipe (denoted by a reference sign 10 in Patent Document 1). Further, Patent Document 2 discloses a connecting structure in which both of the membrane element and the water collection pipe are directly connected without using the junction pipe like Patent Document 1.

When such membrane filtration devices are immersed in a liquid phase, for instance, various deposits adhere to the membrane element etc. according to operating conditions. For this reason, for the membrane element etc., a cleaning process is performed as necessary, for instance, by performing air-washing of surfaces of the membrane element etc. using e.g. an air diffuser or by performing backwashing (back-pressure washing) of the membrane element etc. by temporarily reversing flow of the treated water in the membrane element and in the water collection pipe.

PATENT DOCUMENT

Patent Document 1: Japanese Patent No. 6319510 Patent Document 2: Japanese Unexamined Patent Application Publication No. 2019-051463

SUMMARY OF THE INVENTION

Various stresses are applied to the connecting structure between both of the membrane element and the water collection pipe according to the operating conditions.

For instance, in the case of the air-washing, it is conceivable that the stress will occur due to a shearing force occurring when bubbles from the air diffuser come into contact with the surfaces of the membrane element.

In the case of the backwashing, while the treated water is being reversed, an inside of the water collection pipe is brought to a decompression state, then it is conceivable that the stress will occur due to a force in a direction in which a diameter of the water collection pipe is reduced.

Therefore, for the above connecting structure, it is desirable to ensure desired connection reliability by improving e.g. liquid tightness and durability. As an example, a reinforcing member may be provided in the connecting structure. However, there is a risk that this will increase in size of the connecting structure.

The present invention was made in view of the above technical problem. An object of the present invention is therefore to provide a technique that can contribute to improvement in the connection reliability while suppressing the increase in size of the connecting structure.

A connecting structure and a membrane filtration device according to the present invention can contribute to solution to the above problem. As one aspect of the connecting structure according to the present invention, a connecting structure comprises: a membrane element having a filtration main body used for membrane separation, a water collection portion that collects treated water having undergone the membrane separation from an end portion of the filtration main body and a treated water lead-out portion that leads out the treated water coming from the water collection portion; and a water collection pipe having a tubular peripheral wall to which the treated water lead-out portion is connected and collecting the treated water led out from the treated water lead-out portion, wherein the tubular peripheral wall has a thick portion that is thicker in a radial direction of the tubular peripheral wall and a connecting hole that penetrates the thick portion in an inward-and-outward direction of the tubular peripheral wall, and the treated water lead-out portion is connected to the connecting hole and communicates with an inside of the tubular peripheral wall.

Further, the thick portion of the tubular peripheral wall is provided, in a horizontal direction among the radial direction of the tubular peripheral wall, at an upper-side peripheral wall portion located at an upper side in the radial direction of the tubular peripheral wall.

Further, the thick portion of the tubular peripheral wall is provided, in a horizontal direction among the radial direction of the tubular peripheral wall, at a lower-side peripheral wall portion located at a lower side in the radial direction of the tubular peripheral wall.

Furthermore, the water collection pipe having the tubular peripheral wall is a non-dividable long structure that is not divided in an axial direction of the water collection pipe.

Moreover, a pair of membrane modules, each of which is formed by the plurality of membrane elements arranged at predetermined intervals in an axial direction of the tubular peripheral wall, are arranged on opposite sides of the tubular peripheral wall, and the tubular peripheral wall is provided with the connecting holes at positions facing the treated water lead-out portions of the membrane elements of the pair of membrane modules.

In addition, the treated water lead-out portion has a liquid-tight portion that is liquid-tightly inserted into the connecting hole and a fitting portion that is fitted into the connecting hole.

As one aspect of the membrane filtration device according to the present invention, a membrane filtration device having any one of the above connecting structures, comprises: a rack whose plurality of frames are assembled into an enclosure, wherein a membrane module formed by the plurality of membrane elements arranged at predetermined intervals in an axial direction of the tubular peripheral wall is accommodated and supported in the rack.

According to the present invention described above, it is possible to contribute to improvement in the connection reliability while suppressing the increase in size of the connecting structure.

EMBODIMENTS FOR CARRYING OUT THE INVENTION

A connecting structure and a membrane filtration device according to an embodiment of the present invention are completely different from a configuration (hereinafter referred to simply as a conventional connecting structure) in which a reinforcing member is merely provided in the connecting structure.

That is, in the present embodiment, a membrane element having a filtration main body used for membrane separation, a water collection portion that collects treated water having undergone the membrane separation from an end portion of the filtration main body and a treated water lead-out portion that leads out the treated water coming from the water collection portion is used. Further, a water collection pipe having a tubular peripheral wall to which the treated water lead-out portion is connected and collecting the treated water led out from the treated water lead-out portion is used.

The tubular peripheral wall of the water collection pipe has a thick portion that is thicker in a radial direction of the tubular peripheral wall and connecting holes that penetrate the thick portion in an inward-and-outward direction of the tubular peripheral wall. Further, the treated water lead-out portion of the membrane element is connected to the connecting hole, and communicates with an inside of the tubular peripheral wall.

Figure 6:
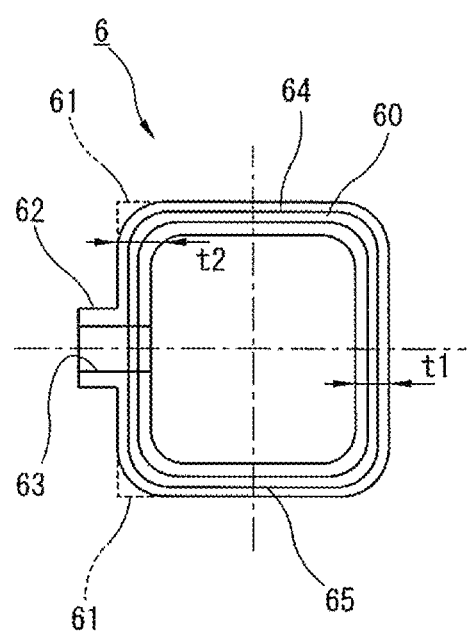
FIG. 6 is a schematic sectional view (a sectional view cut in a radial direction of a tubular peripheral wall) for describing a thickness t1 in the radial direction of the tubular peripheral wall from an upper-side peripheral wall portion to a lower-side peripheral wall portion and a thickness t2 in a horizontal direction.

In a structure that is different from the present embodiment, for instance, in the case of Patent Document 2, a water collection pipe 6 as shown in FIG. 6 (corresponding to FIG. 1B in Patent Document 2) is used. A thickness of a tubular peripheral wall 60 of this water collection pipe 6 in a radial direction of the tubular peripheral wall is t1, and the water collection pipe 6 has a connecting hole 63 having a shape that merely protrudes outwards from a middle-side peripheral wall portion 62 (between an upper-side peripheral wall portion 64 and a lower-side peripheral wall portion 65) located in the middle in a vertical direction (in an arrow Z1Z2 direction of the after-mentioned FIG. 1). In the case of this water collection pipe 6, there is a risk that a size of the water collection pipe 6 will increase at the middle-side peripheral wall portion 62.

On the other hand, in the case of the connecting structure of the present embodiment, since the connecting holes are formed at the thick portion (i.e. a thick portion that can be formed thicker in an inward direction of the tubular peripheral wall) that is thicker in the radial direction of the tubular peripheral wall so as to penetrate the thick portion in the inward-and-outward direction of the tubular peripheral wall, as compared with Patent Document 2, increase in size of the connecting structure can be suppressed.

Further, by connecting the treated water lead-out portion of the membrane element to the connecting hole of the thick portion, an influence of various stresses that may be applied to the connecting structure can be suppressed, and desired liquid tightness and durability can be easily obtained in the connecting structure between both of the membrane element and the water collection pipe.

Both of the thick portion and the connecting hole are provided on the tubular peripheral wall at a position facing the treated water lead-out portion of the membrane element in the radial direction of the tubular peripheral wall, then the treated water lead-out portion and the connecting hole can be connected.

Figure 1:
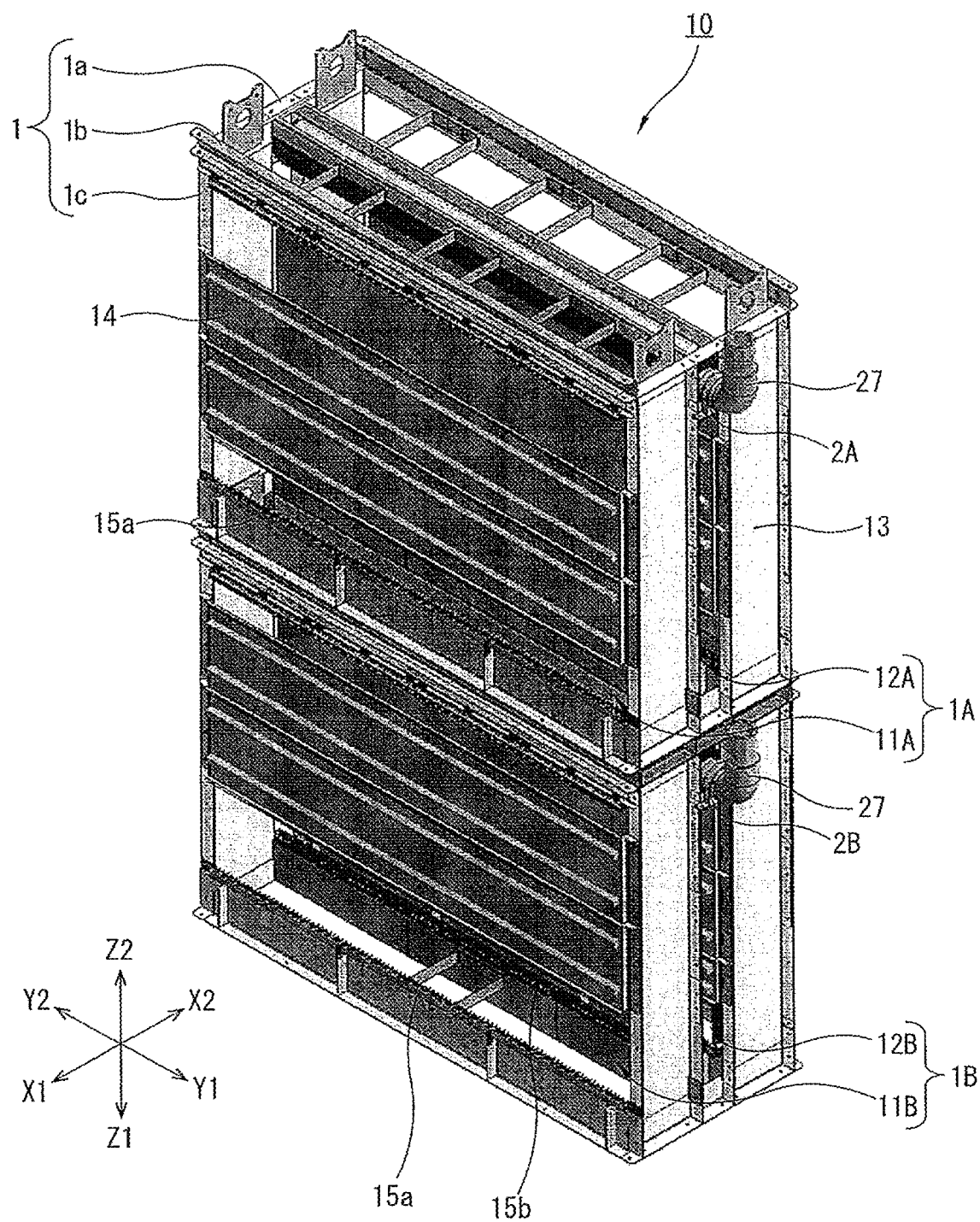
FIG. 1 is a schematic view (a schematic perspective view) for describing an example of a membrane filtration device 10 according to the present embodiment (membrane modules formed by membrane elements 3 are omitted, and a rack 1 and water collection pipes 2 are mainly illustrated).

Here, when focusing attention on a configuration in which the water collection pipe 6 of FIG. 6 is applied to the membrane filtration device (e.g. the configuration as shown in FIG. 1), it is understood that as shown by dotted lines in FIG. 6, dead spaces 61 are likely to be formed on an outer peripheral side of the upper-side peripheral wall portion 64 located at the upper side in the radial direction of the tubular peripheral wall 60 and on an outer peripheral side of the lower-side peripheral wall portion 65 located at the lower side in the radial direction of the tubular peripheral wall 60.

In addition, a thickness in the horizontal direction (i.e. a thickness t2 in FIG. 6) of the upper-side peripheral wall portion 64 located at the upper side in the radial direction of the tubular peripheral wall 60 and the lower-side peripheral wall portion 65 located at the lower side in the radial direction of the tubular peripheral wall 60 is thicker than t1. Therefore, it is understood that the thick portion is easily formed efficiently at these portions as compared with the middle-side peripheral wall portion 62.

In the case of the connecting structure of the present embodiment, for instance, like the after-described membrane filtration device 10, the thick portion (a thick portion that is thicker in the horizontal direction (in an arrow X1X2 direction in FIG. 1) among the radial direction of the tubular peripheral wall) is provided at an upper-side peripheral wall portion located at an upper side in the radial direction of the tubular peripheral wall (or provided at a lower-side peripheral wall portion located at a lower side in the radial direction of the tubular peripheral wall), then the connecting holes could be provided at the thick portion so as to penetrate the thick portion in the inward-and-outward direction of the tubular peripheral wall. With this, as compared with the conventional connecting structure like FIG. 6, it is possible to efficiently form the thick portion to form the connecting holes. In addition, it is also possible to contribute to shortening of a distance between the water collection pipe and the membrane element.

As described above, according to the present embodiment, as compared with the conventional connecting structure, it is possible to contribute to improvement in the connection reliability while suppressing the increase in size of the connecting structure.

As the connecting structure and the membrane filtration device according to the present embodiment, as described above, the thick portion that is thicker in the radial direction of the tubular peripheral wall is provided at the tubular peripheral wall of the water collection pipe, and the connecting holes are provided at the thick portion so as to penetrate the thick portion in the inward-and-outward direction of the tubular peripheral wall, then the treated water lead-out portion of the membrane element is connected to the connecting hole and communicates with the inside of the tubular peripheral wall. As long as the connecting structure and the membrane filtration device have such configuration, common technical knowledge in various fields (e.g. a field of membrane separation technology or piping technology that are applied to various facilities) could be used as necessary, and also design change could be possible by referring to the prior art documents if necessary.

«Membrane filtration device 10 as an example of the present embodiment»

FIGS. 1 to 4 are drawings for describing the connecting structure and the membrane filtration device 10 having the connecting structure according to the present embodiment. In FIGS. 1 to 4, an arrow Z1Z2 direction corresponds to an installation direction of the membrane filtration device 10, and the arrow X1X2 direction and an arrow Y1Y2 direction each indicate the horizontal direction. Further, in FIGS. 1 to 4, the same element or component is denoted by the same reference sign, and its explanation will be omitted below.

<Main configuration of membrane filtration device 10>

As shown in FIG. 1, the membrane filtration device 10 has a rack 1 whose plurality of frames (frames 1a, 1b and 1c in FIG. 1) are assembled into an enclosure and long strip-shaped water collection pipes 2A and 2B provided so as to extend in the arrow Y1Y2 direction in an upper space 1A and a lower space 1B in the rack 1 respectively. Further, membrane modules (membrane modules (not shown) accommodated in after-mentioned accommodating sections 11A, 12A, 11B and 12B respectively in FIG. 1), each of which is formed by a plurality of membrane elements 3 (described later using FIG. 3) arranged at predetermined intervals in the arrow Y1Y2 direction (in an axial direction of a tubular peripheral wall), are accommodated in the rack 1.

The rack 1 shown in FIG. 1 has a structure in which the plurality of frames 1a extending in the arrow X1X2 direction, the plurality of frames 1b extending in the arrow Y1Y2 direction and the plurality of frames 1c extending in the arrow Z1Z2 direction are assembled into the enclosure. Material constituting the rack 1 is not particularly limited. For instance, metal material such as stainless steel and a variety of resin materials could be used.

In the upper space 1A located at an arrow Z2 direction side in the rack 1, the water collection pipe 2A is provided at a position on the arrow Z2 direction side and in the middle in the arrow X1X2 direction so as to extend in the arrow Y1Y2 direction. Further, the accommodating sections 11A and 12A are arranged on opposite sides of the water collection pipe 2A so as to face each other in the upper space 1A.

In the same manner as the upper space 1A, in the lower space 1B located at an arrow Z1 direction side in the rack 1, the water collection pipe 2B is provided at a position on the arrow Z2 direction side and in the middle in the arrow X1X2 direction so as to extend in the arrow Y1Y2 direction. Further, the accommodating sections 11B and 12B are arranged on opposite sides of the water collection pipe 2B so as to face each other in the lower space 1B.

The accommodating sections 11A, 12A, 11B and 12B are each provided, at the arrow Z1 direction sides thereof, with a pair of supporting portions 15a and 15b that are spaced a predetermined distance and extend in the arrow Y1Y2 direction. Each membrane element 3 of the accommodated membrane module is then supported (for instance, a footer 33 of the membrane element 3 is supported) by these supporting portions 15a and 15b.

Shielding panels 13 and 14 are provided at each side portion in the horizontal direction of the accommodating sections 11A, 12A, 11B and 12B so as to shield outer peripheral sides of the membrane modules accommodated in the accommodating sections 11A, 12A, 115 and 12B. With these shielding panels 13 and 14, for instance, bubbles by an after-mentioned air diffuser are prevented from coming out to the outside from each side portion in the horizontal direction of the accommodating sections 11A, 12A, 11B and 12B.

The air diffuser (not shown) having e.g. a plurality of air blow holes is provided at the arrow Z1 direction side of the rack 1 (at the arrow Z1 direction side of the lower space 1B in FIG. 1) . For instance, by blowing the air from each air blow hole of the air diffuser in a state in which the membrane filtration device 10 is immersed in a liquid phase, bubbles can be generated in the rack 1.

The bubbles rise in the arrow Z2 direction, for instance, along each surface of the membrane element 3 of the membrane module (e.g. between adjacent membrane elements 3) and generate a shearing force when coming into contact with the surfaces of the membrane element 3, then the surfaces of the membrane element 3 are cleaned with air (for instance, deposits are removed).

<Configuration of water collection pipes 2A and 2B>

Figure 2:
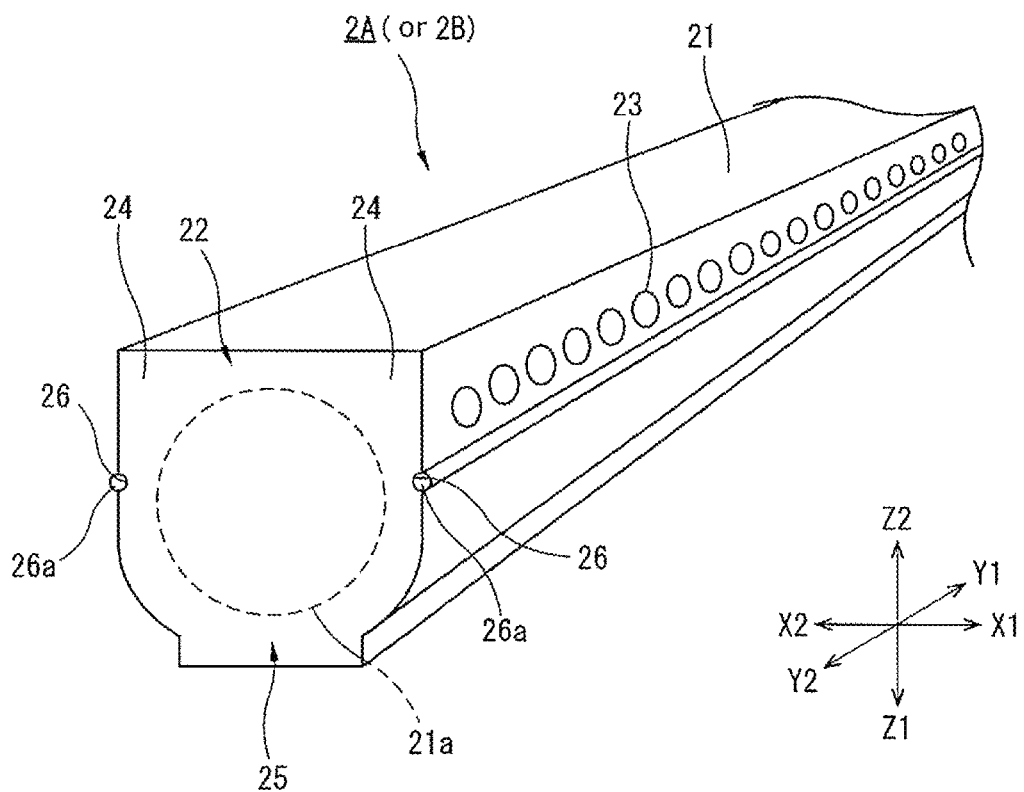
FIG. 2 is a schematic view for describing an example of the water collection pipe 2.
Figure 4:
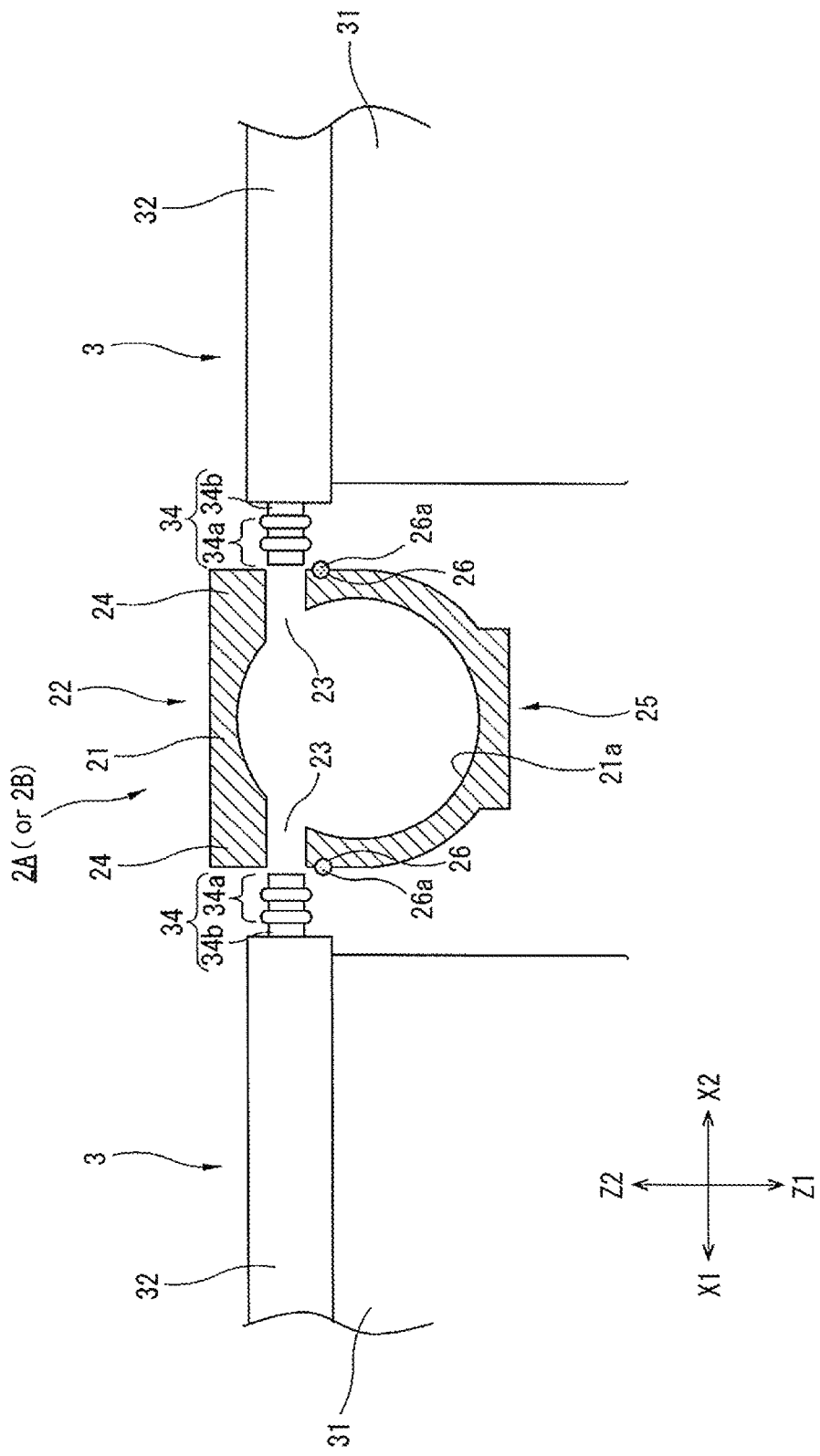
FIG. 4 is a schematic view (corresponding to a sectional view of a main part of the water collection pipe 2, cut in an arrow X1X2 direction of FIG. 1, illustrating a state in which the water collection pipe 2 and the membrane element 3 are not connected) for describing an example of a connecting structure between both of the water collection pipe 2 and the membrane element 3 according to the present embodiment.

As shown in FIGS. 2 and 4, each of the water collection pipes 2A and 2B mainly has a long strip-shaped tubular peripheral wall 21 having an inner peripheral surface 21a which is substantially circular in radial direction cross section and a plurality of connecting holes 23 arranged in the arrow Y1Y2 direction (in an axial direction of the tubular peripheral wall 21) at an upper-side peripheral wall portion 22 located at the arrow Z2 direction side of the tubular peripheral wall 21 (at an upper side in the radial direction of the tubular peripheral wall 21).

The tubular peripheral wall 21 has, at the upper-side peripheral wall portion 22, thick portions 24 that are thicker in the arrow X1X2 direction (in the horizontal direction among the radial direction of the tubular peripheral wall 21), and the thick portion 24 is substantially trapezoidal in radial direction cross section.

Each connecting hole 23 is provided at a position facing a treated water lead-out portion of the membrane element 3 of the membrane module so as to penetrate the thick portion 24 in the inward-and-outward direction (in the arrow X1X2 direction) of the tubular peripheral wall 21.

Of all outer peripheral surfaces of the tubular peripheral wall 21, strip-shaped grooves 26 extending in the arrow Y1Y2 direction are formed at positions on outer peripheral edge surfaces at the arrow Z1Z2 direction side of the connecting hole 23 of the upper-side peripheral wall portion 22 (at positions on outer peripheral edge surfaces at the arrow Z1 direction side in FIGS. 2 and 4) Further, shock absorbing materials (e.g. rubber sheets) 26a are provided at the respective strip-shaped grooves 26 so as to fill the respective strip-shaped grooves 26. Then, with the shock absorbing material 26a, for instance, even if the tubular peripheral wall 21 and an after-mentioned header 32 collide with each other, the shock of the collision can be absorbed.

By opening an end portion, for instance, at the arrow Y1 direction side of the tubular peripheral wall 21 and providing a pipe 27 etc. at the end portion as shown in FIG. 1, treated water collected in the tubular peripheral wall 21 can be taken out to the outside (e.g. a place where a treatment process in a subsequent stage of the membrane filtration device 10 is performed).

A shape of the water collection pipes 2A and 2B (for instance, an outside diameter and an inside diameter of the tubular peripheral wall 21, a length in the arrow Y1Y2 direction of the tubular peripheral wall 21), a shape (for instance, a diameter of the hole (a hole size)) of the connecting hole 23 and arrangement and the number of the connecting holes 23 can be appropriately set according to an amount of the treated water and so on of the membrane filtration device 10 provided with the membrane elements 3.

Material constituting the water collection pipes 2A and 2B is not particularly limited. For instance, it could be metal material such as stainless steel, resin materials such as polyethylene, polypropylene and polyvinyl chloride, composite material of polyvinyl chloride and fiber-reinforced plastics, composite material of polyethylene and fiber-reinforced plastics and so on, and these materials can be appropriately selected and used.

Further, by using various molding techniques such as injection molding, extrusion molding and cutting process using the above material, it is possible to form the long water collection pipes 2A and 2B having non-divided structure (non-dividable structure) without dividing the pipe in the axial direction (in the arrow Y1Y2 direction) as shown in FIGS. 2 and 4.

Here, for instance, like Patent Documents 1 and 2, it could be possible to form the water collection pipe having a multi-stage structure (i.e. the water collection pipe that can be divided in the axial direction) in which a plurality of tubular bodies (cylinder portions denoted by a reference sign 6 in Patent Document 1, and unit water collection portions denoted by a reference sign 10 in Patent Document 2) are arranged in the axial direction. However, in such cases, it is required to interpose a sealing member between the tubular bodies. Also, a process to connect each tubular body is needed. Further, when the sealing member between the tubular bodies deteriorate with time, maintenance such as separation of each tubular body and replacement of the sealing member becomes necessary.

<configuration of membrane element 3>

Figure 3:
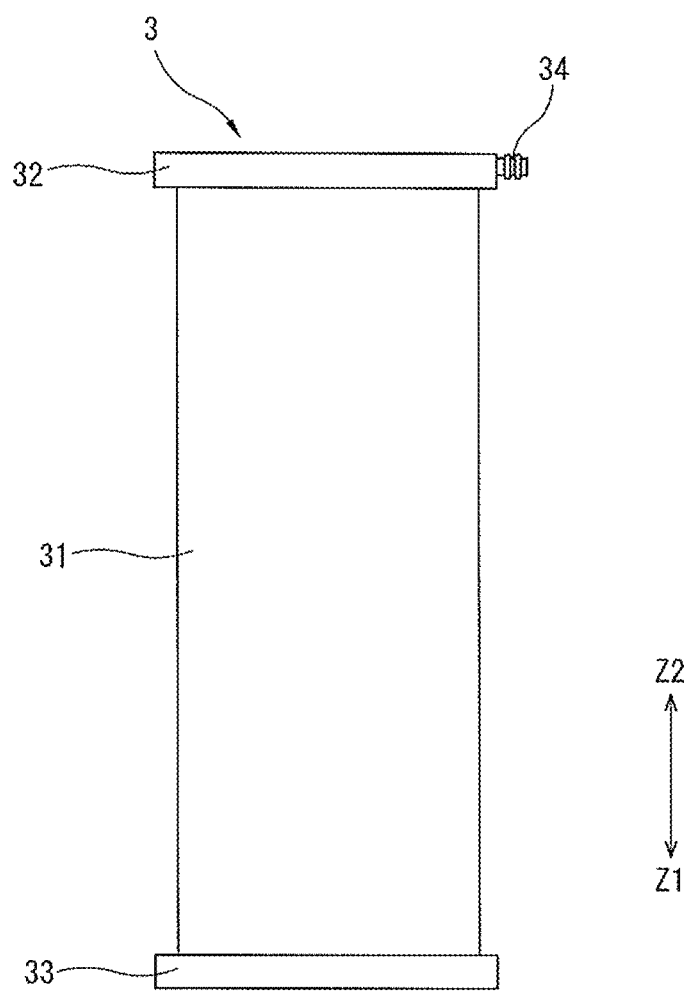
FIG. 3 is a schematic view for describing an example of the membrane element 3.

As shown in FIGS. 3 and 4, the membrane element 3 mainly has a filtration main body 31, the header 32 and the footer 33.

The filtration main body 31 is used for solid-liquid separation, and is formed using e.g. a flat filtration member. Inside this filtration member, flow passages or flow gaps are formed as spaces where filtered water obtained by the solid-liquid separation flows. The filtration member is not particularly limited as long as the filtration member has a filtering function, and various shapes or structures can be used. As an example, it could be a structure in which filtration membranes are formed on surfaces (flat main surfaces at the arrow Y1Y2 direction sides of the filtration main body 31) of a water-permeable flat supporting body.

The header 32 and the footer 33 are liquid-tightly fixed to one end portion and the other end portion of the filtration main body 31 respectively, for instance, by adhesion, welding or molding.

The header 32 functions as a water collection portion that collects the treated water of the solid-liquid separation from the one end portion of the filtration main body 31. The header 32 is provided, at one end portion thereof (at an end portion in the arrow X2 direction of the header 32 in FIG. 3), with a treated water lead-out portion 34 made of a pipe-shaped member. This treated water lead-out portion 34 is connected to the connecting hole 23 of the tubular peripheral wall 21 with the treated water lead-out portion 34 being fitted into the connecting hole 23, then the treated water solid-liquid-separated by the membrane element 3 can be led out into the tubular peripheral wall 21.

In a case of the treated water lead-out portion 34 shown in FIG. 4, the treated water lead-out portion 34 has a liquid-tight portion 34a that is inserted into the connecting hole 23 of the tubular peripheral wall 21 and a fitting portion 34b that is provided at the one end portion of the header 32 and fitted into the connecting hole 23. Water-sealing members 34c that liquid-tightly seal a gap between the liquid-tight portion 34a and the connecting hole 23 are attached to or fitted onto an outer peripheral surface of the liquid-tight portion 34a.

The other end portion of the header 32 (an end portion in the arrow X1 direction of the header 32 in FIG. 3) is supported, for instance, by a supporting portion (not shown) provided in the respective accommodating sections 11A, 12A, 11B and 12B (e.g. at the arrow Z2 direction sides of the respective accommodating sections 11A, 12A, 11B and 12B).

As for the footer 33, both ends (at the arrow X1X2 direction sides) of the footer 33 are supported by the supporting portions 15a and 15b.

Materials constituting the filtration main body 31, the header 32 and the footer 33 are not particularly limited. For instance, they could be metal used for solid-liquid separation technology, well-known inorganic material such as ceramic and well-known organic material such as polymeric resin (high polymer resin). Further, these materials are appropriately selected and used so as to have a strength enough to prevent damage by, for instance, gas-liquid mixed flow for cleaning the filtration main body 31 when the filtration main body 31, the header 32 and the footer 33 are installed as a membrane separation device.

As material constituting the treated water lead-out portion 34, the same material as those of the filtration main, body 31, the header 32 and the footer 33 could be used. Although this treated water lead-out portion 34 has a cylindrical shape, the treated water lead-out portion 34 may have a polygon such as a triangle and a quadrangle in cross section, except for a circle. Further, by forming the fitting portion 34b into a tapered shape, it is possible to contribute to improvement in liquid-tightness. As the water-sealing member 34c, a well-known elastic member such as an O-ring used for water treatment technology can be used.

The plurality of membrane elements 3 as described above are accommodated in each of the accommodating sections 11A, 12A, 11B and 12B. The membrane elements 3 are arranged at predetermined intervals in the arrow Y1Y2 direction (in the axial direction of the tubular peripheral wall) in each of the accommodating sections 11A, 12A, 11B and 12B with the filtration main bodies 31 of the membrane elements 3 facing each other (for instance, in a posture in which the membrane elements 3 stand in the arrow Z1Z2 direction as shown in FIG. 3), then the membrane modules are formed in the accommodating sections 11A, 12A, 11B and 12B.

<Connecting structure>

In order to connect the connecting hole 23 of the tubular peripheral wall 21 and the treated water lead-out portion 34 of the membrane element 3, first, as shown in FIG. 4, the tubular peripheral wall 21 and the membrane element 3 are arranged so that the connecting hole 23 and the treated water lead-out portion 34 are close to each other while facing each other.

Then, by moving the tubular peripheral wall 21 and the membrane element 3 in a direction in which both of the tubular peripheral wall 21 and the membrane element 3 get closer to each other and fitting and inserting the treated water lead-out portion 34 into the connecting hole 23 from the liquid-tight portion 34*a* of the treated water lead-out portion 34, the connecting hole 23 and the treated water lead-out portion 34 can be liquid-tightly connected, then the treated water lead-out portion 34 can communicate with an inside of the tubular peripheral wall 21.

<Modification>

The connecting structure between the connecting hole 23 of the tubular peripheral wall 21 and the treated water lead-out portion 34 of the membrane element 3 is not limited to that shown in FIG. 4. For instance, the connecting structure can be changed as necessary according to the structure or configuration of the water collection pipes 2A and 2B and the membrane element 3.

Figure 5:
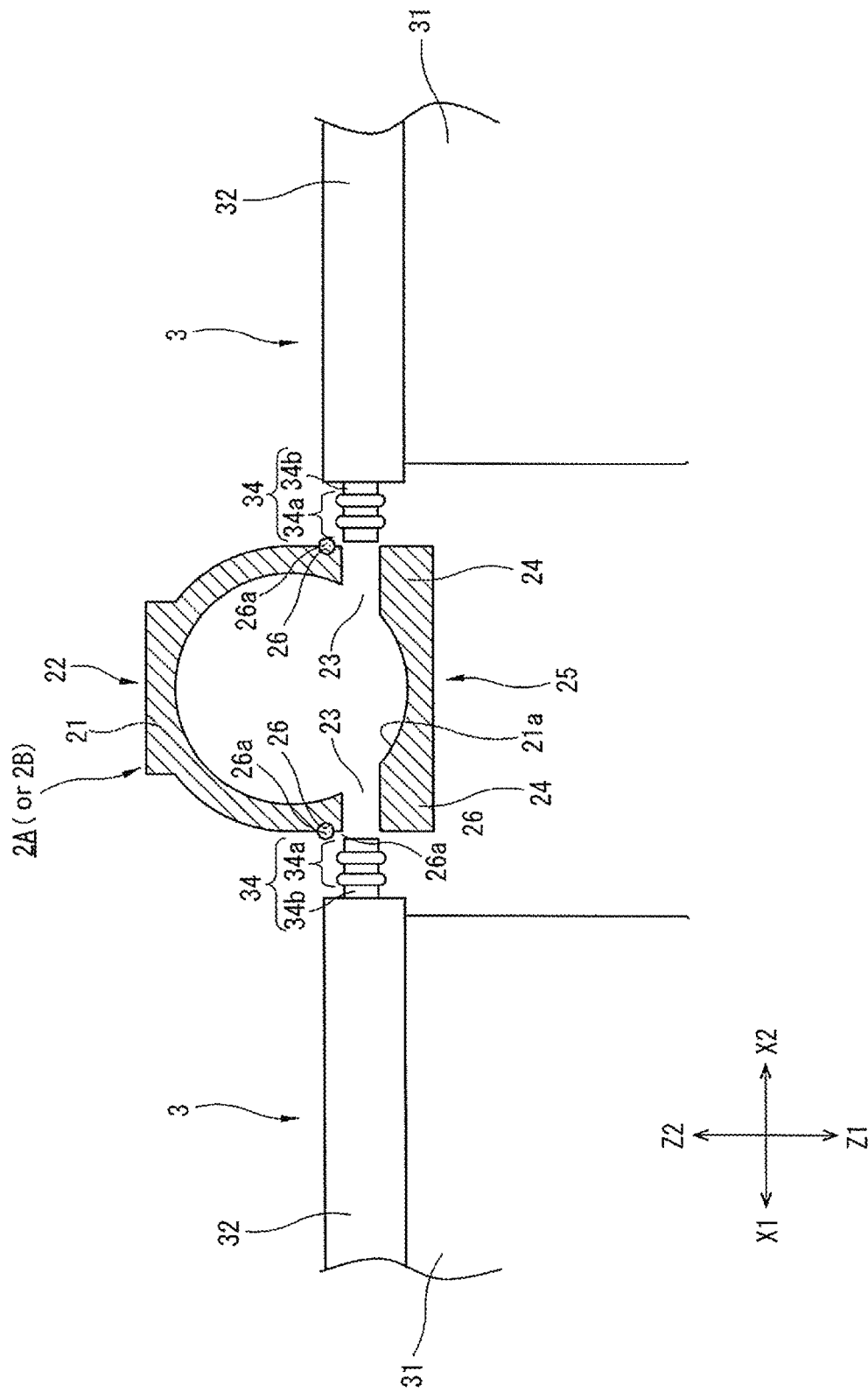
FIG. 5 is a schematic view (corresponding to a sectional view of a main part of the water collection pipe 2, cut in the arrow X1X2 direction of FIG. 1, illustrating a state in which the water collection pipe 2 and the membrane element 3 are not connected) for describing another example of the connecting structure between both of the water collection pipe 2 and the membrane element 3 according to the present embodiment.

For example, as shown in FIG. 5, a connecting structure in which thick portions 24 that are thicker in the arrow X1X2 direction (in the horizontal direction among the radial direction of the tubular peripheral wall 21) are formed at a lower-side peripheral wall portion 25 located at the arrow Z1 direction side of the tubular peripheral wall 21 (at a lower side in the radial direction of the tubular peripheral wall), and the connecting holes 23 are appropriately provided at the thick portions 24 of the lower-side peripheral wall portion 25 could be possible.

In a case of this connecting structure as shown in FIG. 5, as compared with the connecting structure as shown in FIG. 4, a distance in the arrow Z1Z2 direction between an arrow Z1 direction side (a bottom side) of the inner peripheral surface 21*a* of the tubular peripheral wall 21 and an arrow Z1 direction side (a bottom side) of the connecting hole 23 is shortened. With this, it is possible to suppress generation of the so-called dead water region of the treated water flowing in the tubular peripheral wall 21.

Although the present invention has been described in detail only with respect to the embodiment described above, it is obvious to those skilled in the art that various modifications can be made within the scope of the technical idea of the present invention, and as a matter of course, such modifications belong to the scope of claims.

The invention claimed is:

1. A connecting structure comprising:
   a membrane element having a filtration main body used for membrane separation, a water collection portion that collects treated water having undergone the membrane separation from an end portion of the filtration main body and a treated water lead-out portion that leads out the treated water coming from the water collection portion; and
   a water collection pipe having a tubular peripheral wall to which the treated water lead-out portion is connected and collecting the treated water led out from the treated water lead-out portion, wherein
   the tubular peripheral wall has a thick portion that is thicker in a radial direction of the tubular peripheral wall, and a connecting hole that penetrates the thick portion in an inward-and-outward direction of the tubular peripheral wall,
   the treated water lead-out portion is connected to the connecting hole and communicates with an inside of the tubular peripheral wall, and
   the thick portion of the tubular peripheral wall is provided, in a horizontal direction among the radial direction of the tubular peripheral wall, at an upper-side peripheral wall portion located at an upper side in the radial direction of the tubular peripheral wall, and the thick portion is thicker in the horizontal direction.

2. The connecting structure as claimed in claim 1, wherein the water collection pipe having the tubular peripheral wall is a non-dividable long structure that is not divided in an axial direction of the water collection pipe.

3. The connecting structure as claimed in claim 1, wherein
   a pair of membrane modules, each of which is formed by the plurality of membrane elements arranged at predetermined intervals in an axial direction of the tubular peripheral wall, are arranged on opposite sides of the tubular peripheral wall, and
   the tubular peripheral wall is provided with the connecting holes at positions facing the treated water lead-out portions of the membrane elements of the pair of membrane modules.

4. The connecting structure as claimed in claim 1, wherein
   the treated water lead-out portion has a liquid-tight portion that is liquid-tightly inserted into the connecting hole and a fitting portion that is fitted into the connecting hole.

5. A membrane filtration device having the connecting structure as claimed in claim 1, comprising:
   a rack whose plurality of frames are assembled into an enclosure, wherein
   a membrane module formed by the plurality of membrane elements arranged at predetermined intervals in an axial direction of the tubular peripheral wall is accommodated and supported in the rack.

6. A connecting structure comprising:
   a membrane element having a filtration main body used for membrane separation, a water collection portion that collects treated water having undergone the membrane separation from an end portion of the filtration main body and a treated water lead- out portion that leads out the treated water coming from the water collection portion; and
   a water collection pipe having a tubular peripheral wall to which the treated water lead-out portion is connected and collecting the treated water led out from the treated water lead-out portion, wherein
   the tubular peripheral wall has a thick portion that is thicker in a radial direction of the tubular peripheral wall, and a connecting hole that penetrates the thick portion in an inward-and-outward direction of the tubular peripheral wall, the treated water lead-out portion is connected to the connecting hole and communicates with an inside of the tubular peripheral wall, and the thick portion of the tubular peripheral wall is provided, in a horizontal direction among the radial direction of the tubular peripheral wall, at a lower-side peripheral wall portion located at a lower side in the radial direction of the tubular peripheral wall, and the thick portion is thicker in the horizontal direction.

7. The connecting structure as claimed in claim 6, wherein the water collection pipe having the tubular peripheral wall is a non-dividable long structure that is not divided in an axial direction of the water collection pipe.

8. The connecting structure as claimed in claim 6, wherein a pair of membrane modules, each of which is formed by the plurality of membrane elements arranged at predetermined intervals in an axial direction of the tubular peripheral wall, are arranged on opposite sides of the tubular peripheral wall, and the tubular peripheral wall is provided with the connecting holes at positions facing the treated water lead-out portions of the membrane elements of the pair of membrane modules.

9. The connecting structure as claimed in claim 6, wherein the treated water lead-out portion has a liquid-tight portion that is liquid-tightly inserted into the connecting hole and a fitting portion that is fitted into the connecting hole.

10. A membrane filtration device having the connecting structure as claimed in claim 6, comprising:

a rack whose plurality of frames are assembled into an enclosure, wherein a membrane module formed by the plurality of membrane elements arranged at predetermined intervals in an axial direction of the tubular peripheral wall is accommodated and supported in the rack.

* * * * *